INFORMATION TRANSLATING SYSTEM

Filed Dec. 31, 1953 2 Sheets-Sheet 1

INVENTORS
Harry Kleinberg
& John S. Baer
BY Morris L. Rabkin
ATTORNEY

Sept. 24, 1957 H. KLEINBERG ET AL 2,807,664

INFORMATION TRANSLATING SYSTEM

Filed Dec. 31, 1953 2 Sheets-Sheet 2

INVENTORS
Harry Kleinberg
& John S. Baer

BY Morris Rabkin

ATTORNEY

United States Patent Office 2,807,664

Patented Sept. 24, 1957

2,807,664

INFORMATION TRANSLATING SYSTEM

Harry Kleinberg, Pensauken, and John S. Baer, Woodbury, N. J., assignors to Radio Corporation of America, a corporation of Delaware Application December 31, 1953, Serial No. 401,630

8 Claims. (Cl. 178—34)

This invention relates to systems for translating information from a first to a second form, and more particularly to systems for translating information from characters stored on a binary coded medium to printed characters.

Modern science and commerce have occasioned the growth of many systems for handling information. These systems are intended to provide ready storage and rapid manipulation of intelligence. To do so, many employ special coding techniques for representing the information. One widely known coding technique is the binary system employed in many modern computing devices. The binary system is characterized by the use of only two digital values. This feature of the binary system permits the employment of many simple physical devices, which may, by alternative states or conditions, represent these two values. The binary system is particularly adaptable to electrical techniques in which the two binary digit values, usually termed binary "1" and binary "0," may be represented by conduction and non-conduction in an electrical device. The binary decimal system, also well known, represents decimal values from 0 to 9, and individual alphabetic characters, by significant binary combinations. Thus words and messages may be composed of alphabetic as well as numeric intelligence. Conventionally, the characters which are to be used are limited in number, and the necessary combinations are provided by using a six or seven digit binary code.

The manipulation of intelligence in complex sequences, as is practiced today, requires that the intelligence be stored temporarily or permanently. Among the forms of permanent storage for a multi-digit code are magnetic tapes and perforated tapes. Binary digital values may be represented by magnetized spots on magnetic tape and by perforations on paper tape. The stored information, however, cannot easily be read visually. Accordingly, some means is required to print or otherwise present this information for visual recognition.

A particularly simple and efficient printing device is a rotary wheel having type characters on its outer surface. Such a rotary wheel, turning continuously, will print on paper when the paper is rapidly and momentarily forced against a type on the wheel by an adjacent hammer. Since only a single wheel and a single hammer need be employed, this type of rotary wheel printer is extremely simple and inexpensive. The hammer, however, must be actuated at the precise time in the rotation of the wheel at which the desired character will print. Previous methods of reading stored information and providing this precise hammer actuation (which may be said to be a form of pulse position modulation) have usually employed a complex storage or switching technique. Thus, these methods have often been costly and unwieldy.

Accordingly, an important object of this invention is to provide an improved system for converting information from a first to a second code which is simpler than those previously known in the art.

Another object of this invention is to provide an improved system for converting information from a binary code to a pulse position modulation code, which system is characterized by simplicity and economy.

A further object of this invention is to provide an improved device for actuating a rotary wheel printer in response to stored information, which device is less costly than devices previously available.

Yet another object of this invention is to provide an improved device for reading information stored in binary form on a perforated tape and for printing that information on the same tape more rapidly and economically than heretofore possible.

The features of this invention provide a system of general application in information translating systems. A specific embodiment is described for purposes of illustration. The specific embodiment may be utilized for printing, on the edge of a paper tape, the characters represented by coded perforations on the same tape.

According to the present invention, a separate information handling channel is employed for each binary digital position of the code employed. The perforations on a tape are sensed, and digital signals are generated in one of two binary-valued paths within each of the channels. The signals actuate one of two corresponding binary-valued light sources in the same channel. Each channel also includes a photoelectric cell responsive to both lights, and a rotating disk having binary-valued rows of perforations. The disks rotate together and have alternate perforation patterns which together present the code combinations for each desired character. Thus, as the disks rotate, they present a combination of binary-valued holes at each character position. When the corresponding combination is present on the lights, all photoelectric cells are activated. The photoelectric cells are coupled in series and provide an output which signals the point in the cycle of rotation at which recognition occurs.

According to another feature of the invention, the character responsive output of the code recognition device is used to activate a rotary print wheel. The rotary print wheel turns at the same rate as the rotating disks, and the characters on the wheel correspond in angular position to those of the like code positions on the wheel. When an output is provided on recognition of a coded character, therefore, a printing hammer may be actuated, forcing a web of printing material against the rotary print wheel, and causing a character to be typed on the paper. This may be either the same paper as that having the perforated code characters or another paper, as desired.

The novel features of the invention, as well as the invention itself, both as to its organization and method of operation, will best be understood from the following description, when read in connection with the accompanying drawings in which like reference numerals refer to like parts and in which.

Figure 1:
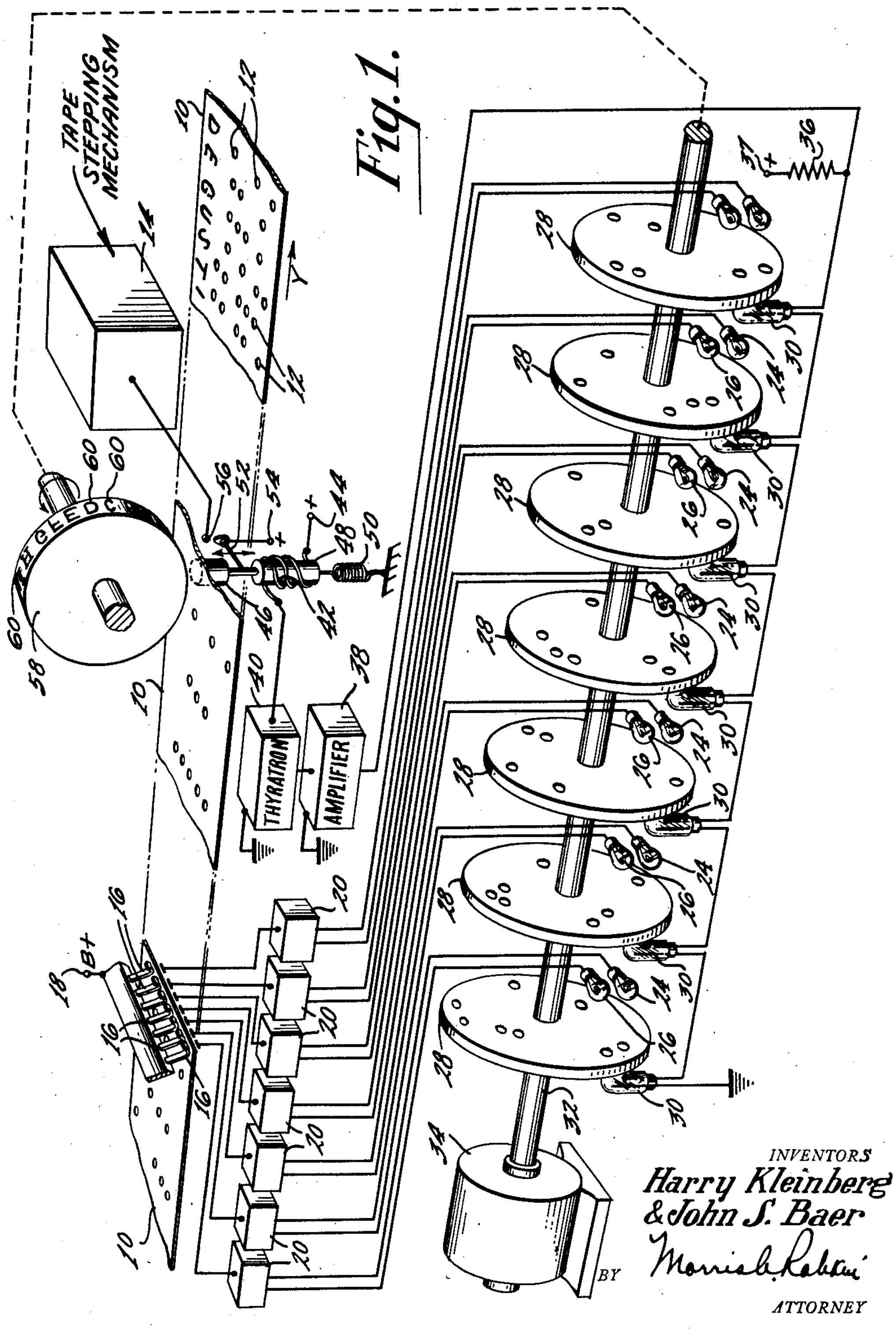
Fig. 1 is a schematic view, partially in perspective and partially in block diagram form, of an illustrative embodiment of the invention.

The specific exemplification of the invention to be described in this specification is shown in Fig. 1. Referring to that figure, there is shown a paper tape 10 having binary coded perforations 12. Each line of perforations 12 across the tape 10 represents a character in seven digit binary code. The tape 10 moves intermittently in the direction shown by the arrow in Fig. 1. This motion is imparted to the tape 10 by a tape stepping mechanism 14 of which many types are known and which is accordingly not further described here.

A margin is provided along one edge of the tape 10 for the printing of the characters recorded in each lateral row of perforations 12. The perforation positions for each digit in the seven digit code are sensed by individual contact sensing brushes 16. Such perforation analyzing devices, and the manner in which such devices operate, are well known. When a contact brush 16 encounters a perforation 12 in the tape 10, the brush 16 completes a circuit between a B+ source 18 common to all the brushes 16 and a switching gate 20 individual to each brush 16.

Figure 3:
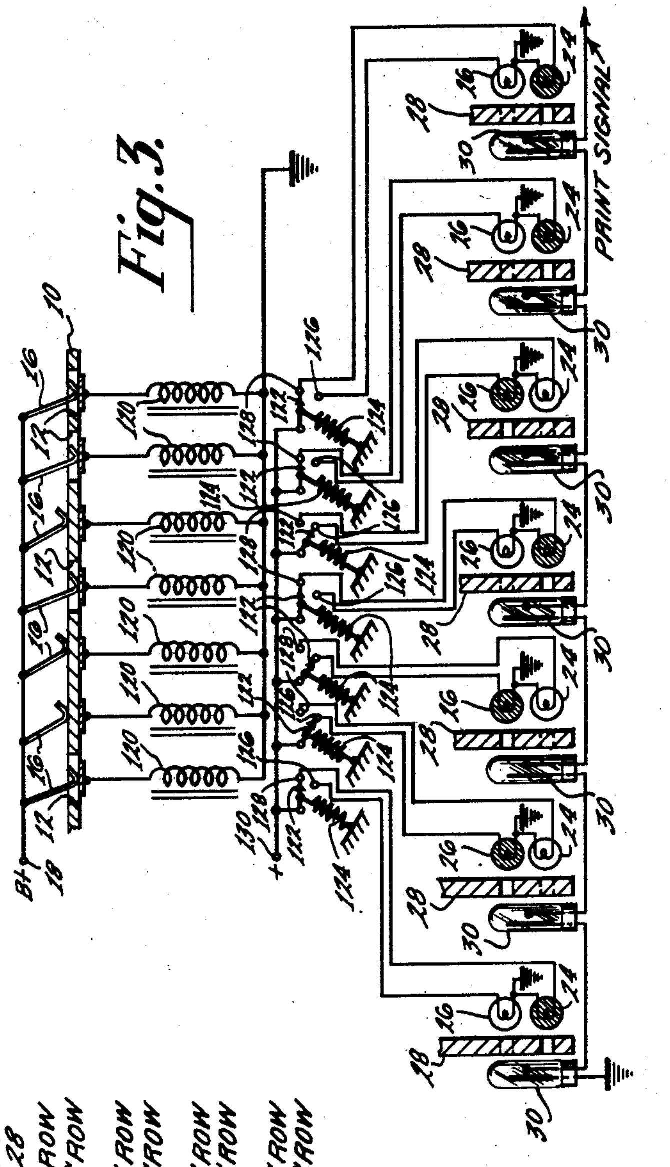
Fig. 3 is a schematic diagram of the arrangement of the individual information bearing channels employed in one embodiment of the present invention.

The switching gate 20 employed in this embodiment may be of the type shown in Fig. 3. Referring to that figure, the contact brushes 16 shown there have, for clarity of illustration, been shifted to a serial position to show the details of the operation. The individual switching gate 20 associated with each contact brush comprises a relay coil 120 and a relay contact 122 normally biased by a spring 124 to be held at a terminal here designated as the binary "0" terminal 126. The relay contacts 122 also each have a binary "1" terminal 128. Each relay coil 120 is connected to a common conductor (here denoted by a conventional ground symbol). Each of the relay contacts 122 is connected to a common (+) voltage supply 130.

Thus, each of the seven switching gates 20 has two output paths, one connected to a binary "0" terminal 126 and the other connected to a binary "1" terminal 128. Each of the seven switching gates 20 may be said to be in a separate digital position channel, the various binary states of the gates 20 representing one character of information. The two output paths for each switching gate 20 are connected to individual lights, designated as binary "1" and binary "0" lights, 24 and 26 respectively, and arranged in pairs in digital channels corresponding to the relay digital channels. This is also shown in the schematic view of Fig. 1.

Each channel (referring to both Figs. 1 and 3) also includes a perforated masking disk 28 adjacent the separate pairs of lights 24 and 26 and a photoelectric cell 30 adjacent the disk 28 and on the opposite side of the disk 28 from the lights 24, 26. The photoelectric cell 30 is responsive to light from both lights 24, 26 of the associated pair. Each disk, therefore, may be considered as a means for selectively blocking one of the signal generating lights 24 and 26 from the light responsive photoelectric cell 30. The disks 28 are mounted on a common shaft 32 and driven by a single motor 34.

Figure 2:
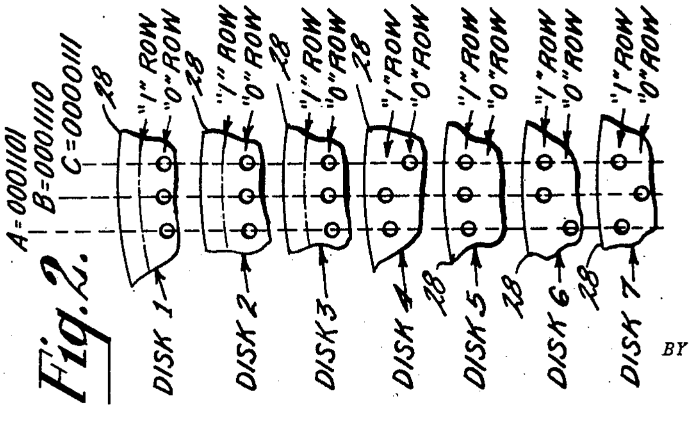
Fig. 2 is a diagrammatic representation of segments of the masking disks employed in the system of Fig. 1, showing the arrangement of the binary-valued perforations thereon.

The perforation patterns on the disks 28 (referring to Fig. 2) are composed of radially displaced binary positions aligned in angularly individual character positions. Each disk 28, therefore, has a digital significance, and the angular position of the disks 28 as a whole has a character significance. The perforations are disposed in concentric binary "1" and binary "0" circles, each associated with one of the pairs of lights. Thus, by way of example, if the binary-value of the character A is denoted a 0001101 in a seven digit binary code, the holes in the various disks 28 are placed as shown under the character A in Fig. 2. The perforation positions for illustrative values of binary coded characters B and C are similarly shown.

Referring again to Fig. 1, the photoelectric cells 30 for the seven digital position channels are connected in series. This series connection is coupled on one side to ground and on the other to one terminal of a resistor 36. The resistor 36 is coupled from this same terminal to an amplifier 38 and thyratron 40 in series, and from the other terminal to a (+) voltage supply 37. The output of the thyratron 40 is coupled through an induction coil 42 to a (+) voltage supply 44. Such an arrangement, which is well known in the art and therefore is shown only schematically, produces a high current pulse of momentary duration through the coil 42 for the short period during which all seven channels provide an output. A reciprocable printing hammer 46 is mounted adjacent the bottom side of the paper tape 10. A core of magnetic material 48 fixed to the printing hammer 46 is positioned within the induction coil 42 and is normally held away from the paper by a biasing spring 50. The firing of the thyratron 40 thus causes a sharp upward movement of the printing hammer 46 against the paper 10 due to the force exerted on the magnetic core 48 by the current pulse in the induction coil 42.

A rotary printing wheel 58 having character outlines 60 on its surface is mounted above the paper tape 10 so that the characters move tangentially to the marginal strip at one side of the tape 10. The printing wheel 58 rotates at the same speed as the masking disks 28 through direct couplings (not shown). The order of the characters on the circumference of the printing wheel 58 is the same as the order of the angularly displaced coded characters on the masking disks 28.

The printing wheel 58 characters may have a slight angular displacement from the masking disk 28 perforation characters to provide a compensation for the delay between the recognition of a coded character and the actuation of the printing hammer 46. When the hammer 46 moves up, an arm 52 fixed to the hammer 46 completes a circuit between a (+) voltage source 54 and a contact 56 coupled to the tape stepping mechanism 14. This circuit, shown schematically, actuates the stepping mechanism 14 and causes it to move the tape 10 a single row of perforations 12.

Figure 4:
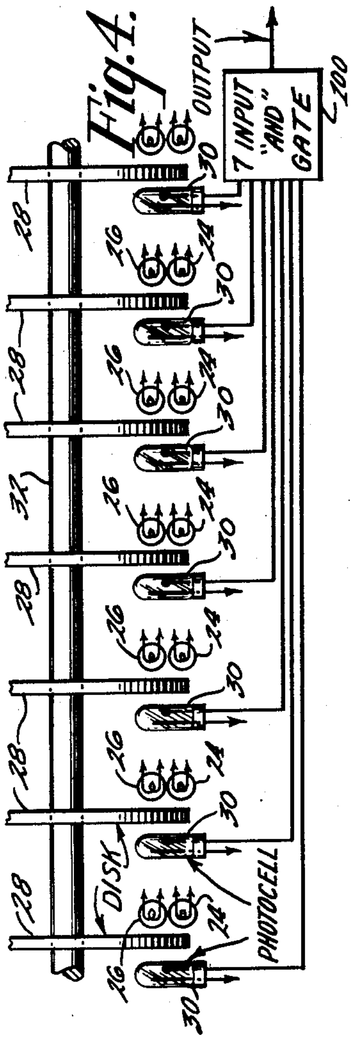
Fig. 4 is an alternate circuit suitable for recognizing coincidence in activation of the photoelectric cells according to the present invention.

An alternate arrangement for coupling the seven photocells 30 is shown in Fig. 4. The photocells 30 are connected in parallel to individual inputs of a seven input "and" gate 100. An "and" gate, well known in the art, provides an output on coincidence of signals on each of its inputs.

In operation, this exemplification of the invention (see Fig. 1) reads the binary coded perforations 12 on the tape 10, and prints the corresponding characters on the margin of the tape 10. The tape 10 is stopped at each reading position with the perforation positions 12 beneath the contact brushes 16. Wherever there is a perforation 12, a brush 16 completes the circuit between the B+ source 18 and the switching gate 20 at the same digital position (see Fig. 3). The binary value represented in Fig. 3 is 1001011, when perforations are taken to represent binary "1's."

When a brush 16 finds a perforation 12, the connected relay coil 120 conducts, since the B+ source 18 is then coupled to ground through the coil 120. Conduction in a coil 120 moves the associated relay contact 122 to the binary "1" terminal 128. Thus, the binary representation on the contacts 122 is also 1001011 (in the illustration shown in Figure 3). Since the contacts 122 close a circuit between a (+) voltage source 130, one of the lights 24 or 26 in the same digital channel, and ground, the lights 24 and 26 are also activated in a 1001011 pattern.

The activated lights 24 and 26 are shown shaded in Fig. 3. Each photoelectric cell 30 is responsive to both lights 24 and 26 in only its associated digital channel. All photoelectric cells 30 are not actuated simultaneously, however, until the code on the masking disks 28 which is in registry with the lights 24 and 26 corresponds to the code on the lights 24 and 26. This arrangement provides the basis of a simple recognition scheme. Since all photoelectric cells 30 are connected in series, all must be activated to provide a print signal. This series connection eliminates the need for costly and complex systems for detecting a number of different code combinations. Furthermore, the recognition signal is provided at a point in rotation and in time which is significant to the recognized character. The operation conforms to the definition of pulse position modulation, which is: Modulation in which the value of each instantaneous sample of a modulating wave (here the discrete binary-coded values) is caused to modulate the position in time of a pulse (i. e., a print signal). In addition, the signal is easily spaced with accuracy in time because the character positions may be placed accurately and because, further, the recognition signals and activation process are the same no matter what the character selected.

The pulse position modulated signal thus resulting is clearly readily suited to the problem of actuating a rotary print wheel 58 at desired points in the cycle of rotation. An output signal from the recognition system (see Fig. 1) causes a brief drop in potential at the connected resistor 36 terminal. This pulse is inverted and increased at the amplifier 38 and used to fire the connected thyratron 40. The firing of the thyratron 40 then momentarily pulses the induction coil 42 and reciprocates the printing hammer 46, thus forcing the paper tape 10 against the print wheel 58 as the desired character on the wheel 58 is opposite the tape 10. As stated previously, the wheel 58 may be placed slightly off-position with respect to the characters on the masking disks 28 to mechanically compensate for delays in the recognition and actuation circuits. The characters may be imparted to the tape 10 by an inked ribbon intermediate the wheel 58 and tape 10 or by inking the characters themselves. As the printing hammer 46 moves upward, the attached contact arm 52 closes the circuit between the (+) voltage source 54 and the tape stepping mechanism 14, thereby actuating the tape stepping mechanism 14 and moving the tape 10 to the next perforation position for a repetition of the recognition process.

Where there are other requirements of speed or signal strength, the coincidence circuit of Fig. 4 may be used to provide a signal on occurrence of character recognition. As in the arrangement of Fig. 1, the photocells 30 are activated by their associated lights 24 and 26. Only when all the photocells 30 are activated are seven input signals directed to the seven input "and" gate 100. Therefore, only under this condition of coincidence does the "and" gate 100 provide an output to actuate the printing hammer (not shown in Fig. 4) and cause a character to be printed. It will be evident that the simplicity of the arrangement of this invention affords the use of other modifications. The tape may be sensed photoelectrically, for example, and electronic switching devices may be used instead of relay contacts.

It will be evident to those skilled in the art that the invention described herein may be employed in many environments. For example, the code in which characters are to be recognized need not be the seven digit binary code described. The code might instead be any binary code of any number of digits. The code also might be any code having only two possibilities of value for each digit, such as the twelve position perforation code employed with statistical cards. The system may further be advantageously employed where other forms of binary number storage are used, such as magnetic tape, and where a coded combination of signals is originated directly, as from a code-creating keyboard adapted for use with a rotary printer. Similarly, only a few particular characters, or one character, need be detected if that be desired.

Thus, there has been described a simple and efficient device for reading coded information and printing the same information in character form. A rapid and accurate device is provided for recognizing a large number of encoded characters. While the system described is of particular advantage in printing characters with a rotary print wheel, the various features of the invention may be employed with benefit in other physical combinations.

What is claimed is:

1. A system for recognizing information encoded in groups of binary-valued digital positions on a storage medium and for printing said information, said system comprising means for sensing the binary values at each digital position in a group, means responsive to said sensing means for generating one of two binary signals for each digital position in a group, means at each digital position responsive to the respective signal generating means at each said position, means for selectively blocking one of said signal generating means from said signal responsive means at each digital position in a group, said blocking means providing different information groupings in a preselected sequence, and means responsive to said signal generating means and coupled to said blocking means for printing characters individual to said different information groupings.

2. A system for recognizing characters encoded in a binary digital code on a tape medium and for printing the corresponding characters, said system comprising means for sensing the binary coded characters on said tape medium, means responsive to said sensing means for providing one of two alternate light radiations for each digital position, means at each digital position for providing an output responsive to the light radiations at each said position, means interposed between said radiation providing means and said radiation responsive means for selectively masking predetermined ones of the light radiations at each digital position, rotary printing means coupled to said masking means, and means for actuating said printing means responsive to coincident outputs of said radiation responsive means.

3. A system for recognizing characters encoded on a tape and printing said characters comprising means for sensing the encoded characters, a pair of conductors for each digital position of the encoded characters, means responsive to said sensing means for generating signals in one of each pair of said conductors, rotatable coded masking means having coded perforations therein for each digital position in the code, said perforations being disposed in parallel combinations individual to particular characters, individual light producing means responsive to each said generating means, each of said light producing means being adjacent one of said coded perforation positions on said masking means, light sensitive means adjacent the perforation positions on said masking means, said light sensitive means being serially coupled, rotatable printing means having character positions corresponding to the code on said masking means, means for rotating said printing wheel synchronously with said masking means whereby to synchronize the positions of said characters and said perforation positions, and means coupled to said serially coupled light sensitive means for actuating said printing means.

4. A system for recognizing characters encoded in a binary digital code on a tape medium and for printing the corresponding characters, said system comprising means for sensing the binary coded characters, a plurality of pairs of radiation source means responsive to said sensing means for producing one of two alternate radiation conditions corresponding to the values of the individual binary digits of the sensed binary code, light sensitive means at each digital position responsive to the radiation conditions at each said digital position, a rotatable masking means disposed between each pair of radiation source means and the responsive light sensitive means, said masking means having two sets of perforations therein, the perforations of each set being registrable with one of the pair of radiation source means and representing a binary digital value at each said digital position, said perforations being grouped in like positions on said masking means and together forming binary coded individual characters, rotatable printing means having character positions corresponding to the character positions on said masking means, means for rotating said printing means synchronously with said masking means whereby to synchronize the positions of said characters and said perforation positions, and means responsive to coincident activation of said light sensitive means at said digital positions for actuating said printing means.

5. The invention as set forth in claim 4, wherein said means for actuating said printing means includes a series coupling between said light sensitive means.

6. The invention as set forth in claim 4, wherein said means for actuating said printing means includes an "and" gate having each of its inputs coupled to a different one of said light sensitive means.

7. A system for recognizing binary-coded characters represented as perforation patterns on a paper tape and for printing the characters so represented on said tape, said system comprising analyzing means for sensing the perforation pattern of each character on said tape, a pair of binary-valued conductors for each perforation position, signal generating means responsive to said analyzing means for providing binary-coded character signals in said conductors, a plurality of synchronously rotatable masking disks, said disks each having binary-valued perforations disposed in two circles concentric with the axis of rotation of said disks, the like perforation positions on said disks constituting individual characters in the binary code, a plurality of radiation sources each coupled to individual ones of said conductors and each disposed in registry with individual ones of said concentric circles, a plurality of serially coupled light sensitive devices each disposed adjacent individual ones of said masking disks and responsive to both radiation sources in registry with that said disk, a rotatable printing wheel having character surfaces thereon corresponding to the code arrangement on said disks, said printing wheel being disposed in operative relation to said tape, means for rotating said printing wheel synchronously with said masking disks whereby to synchronize the positions of said character surfaces and said perforation positions of a printing hammer mounted to reciprocate against said tape to force said tape momentarily against said wheel, and means responsive to said serially coupled light sensitive devices to reciprocate said printing hammer.

8. A system for detecting characters stored on data storage medium in a multi-digit binary code comprising analyzing means for detecting individual characters in said binary code, means including a pair of binary-valued conductors for each digital position in said binary code for providing in said conductors signals responsive to said analyzing means, means for individually detecting signals in any one conductor of said pairs of conductors, means interposed between said signal providing means and said detecting means for blocking from said detecting means selected ones of said conductors at each digital position, and means for providing an output responsive to coincidence in detection of said individual detecting means.

References Cited in the file of this patent

UNITED STATES PATENTS

| | | |
|---|---|---|
| 1,549,907 | Clokey | Aug. 18, 1925 |
| 1,828,556 | Cremer | Oct. 20, 1931 |
| 1,915,993 | Handel | June 27, 1933 |
| 2,438,825 | Roth | Mar. 30, 1948 |
| 2,668,870 | Ridler | Feb. 9, 1954 |